United States Patent [19]

McKinney

[11] Patent Number: 4,618,478
[45] Date of Patent: Oct. 21, 1986

[54] APPARATUS FOR THE PRODUCTION OF LEAD OXIDE

[75] Inventor: Benjamin F. McKinney, Indianapolis, Ind.

[73] Assignee: Oxide & Chemical Corporation, Indianapolis, Ind.

[21] Appl. No.: 718,500

[22] Filed: Apr. 1, 1985

Related U.S. Application Data

[62] Division of Ser. No. 490,149, Apr. 29, 1983, Pat. No. 4,521,399.

[51] Int. Cl.⁴ .............................................. B01F 7/04
[52] U.S. Cl. ................................. 422/198; 422/225; 366/312
[58] Field of Search ............... 422/110, 111, 198, 202, 422/225, 226; 209/134, 153; 366/102, 106, 107, 309, 312; 423/620, 621; 75/77, 78, 120

[56] References Cited

U.S. PATENT DOCUMENTS

| | | | |
|---|---|---|---|
| 155,257 | 9/1874 | Reid | 422/225 |
| 481,005 | 8/1892 | Coleman | 423/620 |
| 846,444 | 3/1907 | Bailey | 422/225 |
| 1,617,887 | 2/1927 | Wilhelm | 423/620 |
| 1,834,693 | 12/1931 | Frischer | 422/225 |
| 2,976,131 | 3/1961 | Milne | 422/226 |
| 3,159,703 | 12/1964 | Wolcott | 422/225 |

FOREIGN PATENT DOCUMENTS

| | | | |
|---|---|---|---|
| 349065 | 5/1931 | United Kingdom | 422/225 |
| 697174 | 11/1979 | U.S.S.R. | 422/110 |

*Primary Examiner*—David L. Lacey
*Attorney, Agent, or Firm*—Joseph J. Jochman, Jr.; Larry L. Shupe; John Phillip Ryan

[57] ABSTRACT

A stationary horizontal cylindrical reactor for the production of lead oxide comprises a series of horizontal rotating blades to promote and maintain the oxidation reaction, to provide a particle size reduction and to effect centrifugal classification of the lead oxide produced in the reaction. The reactor includes a chamber supplied with raw lead, air and water, and by the use of the entire reactor chamber-blade interface as a reaction zone results in a highly energy efficient and high rate production apparatus. The apparatus is extremely versatile and can be used to produce low free lead (less than 1%) litharge (PbO) and high free lead or leady litharge on a consistent high volume basis.

3 Claims, 2 Drawing Figures

APPARATUS FOR THE PRODUCTION OF LEAD OXIDE

This application is a division of Ser. No. 450,149 filed Apr. 29, 1983, now U.S. Pat. No. 4,521,399.

BACKGROUND OF THE INVENTION

The present invention relates generally to the art of manufacturing lead monoxide (PbO) with widely varying free metallic lead content. More specifically, the invention relates to a horizontal cylindrical reactor and its method of operation wherein a series of horizontally disposed rotating blades are utilized to effect the oxidation reaction and to simultaneously grind and classify the lead oxide particles for transfer through and out of the reactor in an induced air draft.

Lead monoxide (also variously referred to as lead oxide or litharge) is an extremely important compound in a variety of industrial manufacturing processes. For example, the largest single use of lead oxide is in the manufacture of lead-acid storage batteries. Large volumes of lead oxide or litharge are also used as fluxing agents in the manufacture of glass. These and various other manufacturing processes require lead oxide with free metallic lead contents ranging from relatively high (18–35%) for the manufacture of batteries to very low (less than 1%) for the manufacture of glass. A variety of old and well-known processes and apparatus have been in use for many years to produce lead oxide for its various applications.

One old and well-known process utilizes the so-called Barton pot as disclosed in U.S. Pat. No. 633,533. In the Barton process, a large heated pot is fed with a stream of molten lead which is maintained at a shallow depth in the bottom. A rapidly rotating blade in the bottom of the pot continuously agitates the molten lead which is oxidized in the presence of a stream of air and water or steam. The oxidized lead particles are drawn from the pot by the air stream while the heavier lead droplets fall by gravity to the bottom of the pot for further agitation and oxidation. The process is controlled by adjusting the rate of feed of the molten lead, the air flow through the pot and the speed of the blades. The Barton process operates at high temperatures, substantially above the melting point of lead which is 327° C. (620° F.). Though quite versatile, the Barton process has several inherent disadvantages. When used for producing high free lead litharges for battery manufacturing, the leady oxides produced are often too coarse for use in the formulation of battery active material paste and must, therefore, be subjected to hammer mill processing subsequent to their initial production in a Barton pot. In addition, the Barton process is difficult to control when used to produce low free lead litharge and cannot be used to consistently produce lead oxide with a free lead content of less than 1%. Finally, the operation of a Barton pot results in a build-up of lead on the blades and walls, requiring periodic shut down and manual cleaning of the component surfaces. A more recent version of this apparatus is disclosed in U.S. Pat. No. 3,322,496. However, unlike the earlier Barton pot, in this device no reservoir of molten lead is maintained in the bottom.

Another widely used process for the manufacture of lead oxide employs a horizontal rotating attrition-type mill. One of the most common types is the Shimadzu mill named after the inventor in U.S. Pat. No. 1,896,020. In the Shimadzu mill, lead oxide is produced by tumbling pieces of metallic lead in a rotating drum in the presence of a stream of air. The heat generated by oxidation and the frictional heat of tumbling provides a self-sustaining reaction. The smaller and lighter oxide particles which are produced may be withdrawn from the mill by various means, one of which may simply be an induced draft of air drawing the lead oxide particles through an outlet in one end. The Shimadzu and related processes are considered low temperature, operating below the melting point of lead. Although relatively high production rates can be attained from a Shimadzu mill, the process is highly energy inefficient because it requires the tumbling of a large mass of metallic lead within the drum. Further, because it is a relatively low temperature process, the Shimadzu mill is not suitable for the manufacture of low free lead litharge.

U.S. Pat. No. 1,204,537 discloses another type of reactor and method for its operation to produce lead oxide. In this apparatus, an inclined frustoconical reactor chamber has disposed therein a rotatable axial shaft carrying a series of composite blades adapted to rotate in close proximity to the inner reactor surfaces. The lower end of each blade has a paddle-like structure which rotates through a lower reservoir of molten lead and lifts and disperses lead droplets into the upper reactor chamber, in a manner somewhat analagous to the operation of the Barton pot described above. The upper portions of the blades act as mixing devices and simultaneously induce a flow of preheated air through the reaction chamber to oxidize the lead particles and transport the same to an upper reactor outlet. Partly oxidized lead and lead particles are returned by gravity to the molten lead reservoir. The operation of this device requires a high energy input and the inherent variation in the edge speed of the tapered mixing blades along the length of the frustoconical reactor results in a nonuniform and ineffecient reaction zone. Correspondingly, any centrifugal classification of the lead oxide is likewise nonuniform. The apparatus disclosed has no known industrial application, either past or present.

German Pat. No. 266,348 discloses a reactor for the production of litharge which is similar to the Barton reactor described above. In this apparatus, however, the mixing blades or paddles are disposed to rotate about a horizontal axis with their edges or tips dipping into the surface of the molten lead in the pot. The operation of this device is otherwise similar to the Barton reactor and is subject to the same operational deficiencies noted above. In particular, the reaction zone is small in comparison to the overall size of the apparatus and classification of the litharge produced by the oxidation reaction is primarily by gravity.

SUMMARY OF THE INVENTION

In the present invention, a series of horizontally disposed rotating blades operate within a cylindrical reactor chamber to simultaneously provide the oxidation reaction of the raw lead infeed, the particle size reduction of the partially oxidized lead and the centrifugal classification of any of a selected range of litharges, from low to relatively high free lead content. The production rates attainable in the reactor of the present invention are substantially higher than devices of the prior art of a comparable size and having similar operating power requirements, primarily due to the utilization of the entire length of the reactor chamber in the oxidation reaction and particle size reduction. In addition, the reactor of the present invention exhibits very stable operating characteristics and is capable of sustaining a continuous uniform oxidation reaction over a long period of time. The operation of the reactor which is the subject of this application is much cleaner and, in particular, is not subject to the detrimental material build-up and resultant operational problems characteristic of the Barton reactor.

DETAILED DESCRIPTION OF THE PREFERRED EMBODIMENT

Figure 1:
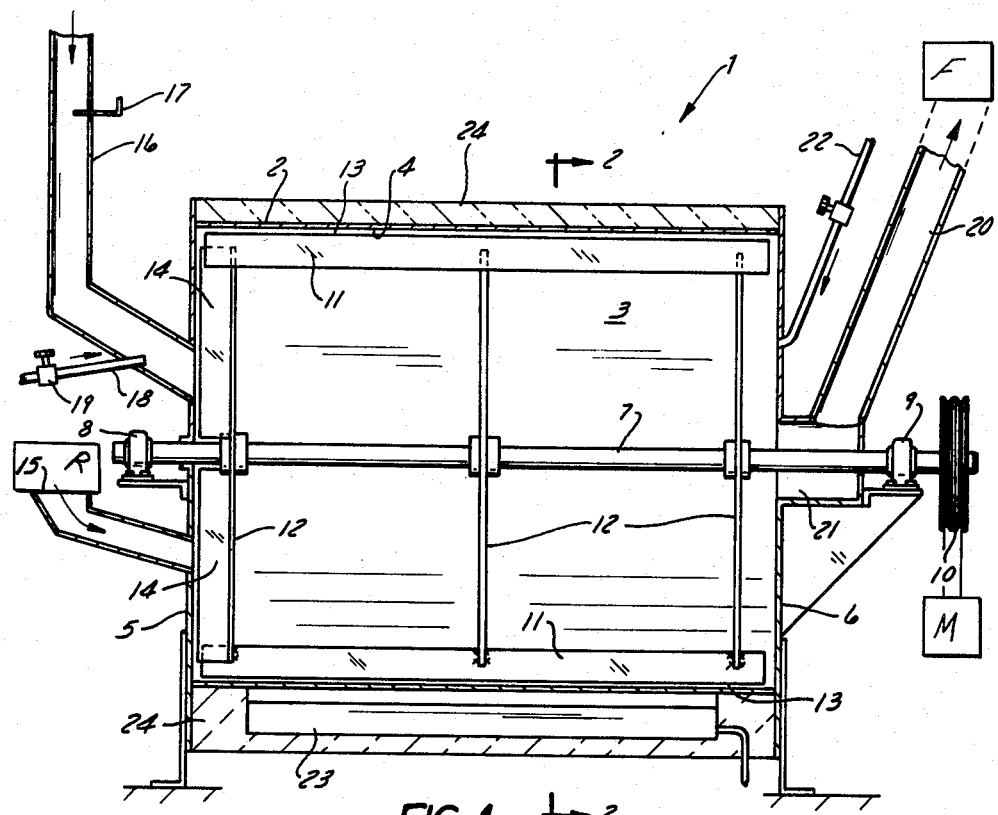
FIG. 1 is a side elevation view of the reactor apparatus of the present invention shown in section through the axis thereof.
Figure 2:
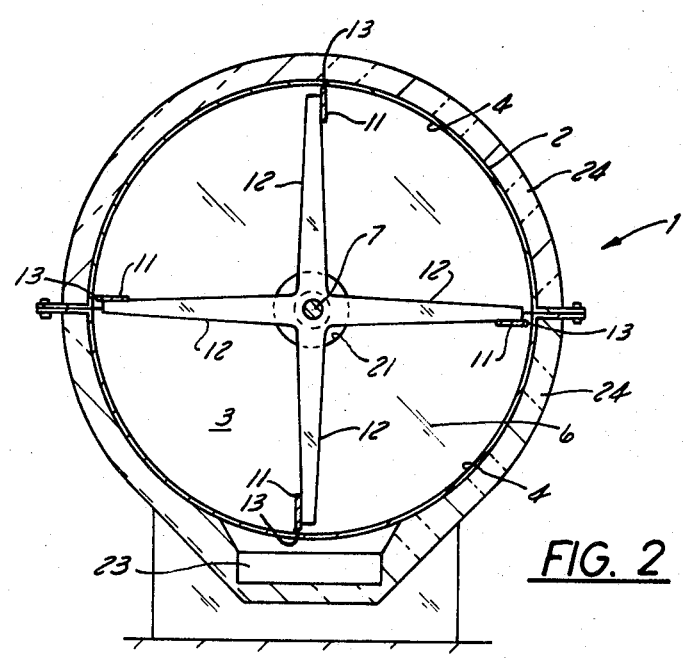
FIG. 2 is a sectional view of the reactor shown in FIG. 1 taken on line 2—2 thereof.

FIG. 1 shows a side elevation of the reactor 1 of the present invention in section along its longitudinal axis. The reactor 1 comprises a horizontally disposed reactor shell 2 defining a reactor chamber 3 having a cylindrical interior surface 4 and parallel oppositely disposed inlet and outlet end walls 5 and 6, respectively. A shaft 7 is disposed on the axis of the cylindrical interior surface 4 of the reaction chamber 3, extends through the end walls 5 and 6 and is supported for rotation in bearings 8 and 9. The shaft 7 is driven by a pulley 10 mounted adjacent to the outlet end wall bearing 9 and operatively connected to a suitable drive means, such as an electric motor M.

Two pairs of oppositely disposed blades 11 are attached to the shaft 7 and supported for rotation therewith by a series of radial struts 12. Each of the blades 11 is disposed parallel to the shaft 7 and mounted with its radially outer blade edge 13 disposed closely spaced from the cylindrical interior surface 4 of the reaction chamber 3 and extending substantially the full length thereof. As will be discussed in more detail hereinafter, the blade edge-interior surface interface is important to the operation of the reactor, however, the actual spacing between the blade edges 13 and the interior surface 4 of the reaction chamber has not been found to be particularly critical. Thus, although a closely spaced relationship must be maintained, a spacing of approximately ⅛ to 1½ inches has been found to be suitable for the broad range of lead oxides with varying free lead contents which can be produced in this reactor. A pair of wiper blades 14 is attached to one pair of oppositely extending struts 12 adjacent the inlet end wall 5. The wiper blades 14 are disposed with their free edges lying closely spaced from the interior surface of the inlet end wall to preclude a build-up of lead and lead oxide which unavoidably occurs since the inlet end of the reactor 1 is inherently somewhat cooler than the remainder thereof during operation.

The components of the oxidation reaction are the reactants, lead and oxygen (the latter preferably in the form of air), and water as a catalyst. The lead supply is preferably maintained in a molten state in an external reservoir R and is fed into the reactor in metered amounts via a lead inlet 15 located in the inlet end wall 5. Oxygen, in the form of a stream of air, is supplied to the reactor through an inlet air duct 16, also in the inlet end wall. The inlet air duct 16 is provided with a variable position damper 17 to control the volume of air admitted to the reactor. Metered amounts of water are also supplied to the inlet end of the reactor and, in the preferred embodiment, a water inlet 18 is located in the air inlet duct 16 a short distance upstream from the inlet end wall 5. The flow of water is selectively controlled with a suitable metering valve 19. A second water inlet 22, in the outlet end wall 6, may also be used to supply all or a part of the water. The product of the oxidation process, varying from substantially pure lead oxide to higher free lead litharges, is carried from the reactor chamber 3 into a lead oxide outlet duct 20 which communicates with the interior of the reactor through an outlet 21 surrounding the shaft 7 in the outlet end wall 6. The continuous flow of air into the reactor through the air inlet duct 16 and the flow of lead oxide-laden air out of the reactor through the outlet duct 20 is preferably provided by an induced draft created by a fan F located downstream of the outlet duct 20.

Although the addition of water to the reactor has been found to be beneficial, both for temperature control and for its apparent catalytic effect, it is not absolutely necessary. Thus, the reactor may be operated without any water and the reaction temperature controlled by varying the lead feed. However, lower production rates will result due to the loss of the catalytic effect and the need to reduce the lead feed to maintain proper operating temperature.

Directly beneath the reactor shell 2 is mounted a preheater 23 which, in the preferred embodiment, is a gas fired burner. The preheater is utilized to bring the entire reactor to a temperature near the eventual operating temperature prior to commencement of operation of the reactor. The entire outer cylindrical surface of the reactor shell, including the preheater, is covered with an insulating shroud 24 to maintain the preheat and to facilitate uniform heat distribution during operation.

The operation of the reactor for either the production of low free lead litharge or for lead oxide with higher free lead contents is substantially the same. The reactor is first brought to a temperature somewhat below the desired operating temperature and at about the melting point of lead. Thus, the preferred preheat temperature is in the range of 205° to 345° C. (400° to 650° F). Once the reactor is operating and the oxidation reaction has commenced, the preheater is shut off and the exothermic reaction raises the reactor to the desired operating temperature where it is maintained by process control, as will be more fully described hereinafter.

The reactor blades 11 are turned at a high speed by driving the shaft 7 at a constant speed in the range of approximately 80 to 400 rpm. The molten lead, air and water are fed simultaneously in controlled amounts through the various inlets 15, 16 and 18 and/or 22, respectively. The molten lead is broken into spherical particles by the action of the blades and, simultaneously with the immediate commencement of oxidation, the particles are sheared and broken into smaller and more irregular shaped particles. The interreaction between the blade edges 13 and the interior surface 4 of the reactor chamber 3 provides much of the shearing and breaking of particles. However, it is also believed that the interaction or attrition between the particles themselves is significant both in the particle size reduction and in the oxidation reaction. The particle attrition and oxidation take place along the entire length of the reactor chamber and around the entire cylindrical interior surface thereof.

The rotation of the blades also serves to simultaneously classify the lead, leady oxide and fully oxidized litharge within the reactor. The centrifugal force imparted to the particulate materials maintains the heavier lead particles nearer the blade edge-reactor wall interface for continuing attrition and oxidation, while the leady oxide or the lower free lead litharge, depending principally on the reactor temperature, the volume of air flow therethrough and the blade speed, is carried through the outlet 21 and into the outlet duct 20 for subsequent collection.

Although it is clear that various factors, including blade speed, the volume of air flow, and the temperature in the reactor, all bear on the oxidation-classification process, it is preferred to operate the blades at a constant optimized speed. An optimum speed in the range of 140 to 250 rpm in a reactor chamber having a five foot diameter is suitable for the broad range of litharges and high lead oxides which may be made in the apparatus and in accordance with the method of the present invention. In a general sense, blade edge speed which is too fast will throw virtually all of the material to the outside of the reactor chamber and interfere with the oxidation reaction. On the other hand, if the blade speed is too slow, uniformity of the oxidation reaction throughout the reactor is lost and eventually proper classification is also lost.

The operating temperature in the reactor is the principal variable for controlling the free lead content of the oxide product. A typical low lead litharge (having a free lead content of less than 1%) requires the maintenance of a constant operating temperature in the range of 425° to 455° C. (800° to 850° F.). To produce a lead oxide with a relatively high free lead content (18% to 32% Pb), a constant and uniform operating temperature in the range of 370° to 400° C. (700° to 750° F.) must be maintained. The temperature of the exothermic oxidation reaction may be controlled in various ways, but it is preferred to control the temperature by the addition of water. Water is also believed to have a catalytic effect on the reaction, but the exact nature of the effect is unknown. During operation, the reactor temperature is continuously monitored and utilized to effect control of the feed of water through one or the other or both of the water inlets 18 and 22. It is also possible to control the reactor temperature by varying the feed of molten lead. However, because uniform blade speed is critical to proper oxidation and classification, it is simpler and more preferable to continuously monitor the load on the reactor drive means and utilize the load signal to control the feed of molten lead to the reactor.

For a reaction product of a given free lead content, the apparent density of the product (which in turn is primarily a function of particle size) is controlled principally by varying the volume of air flow through the reactor. Thus, a lower volume air flow will result in an oxide product containing a greater amount of lighter fines and, therefore, will have a lower apparent density. Conversely, the apparent density may be increased by increasing the volume air flow and thus the amount of coarser and heavier particles carried to the reactor outlet.

In a typical operation for the production of essentially pure litharge (PbO), a reactor of the present invention having a length of eight feet and a diameter of five feet is capable of processing approximately 6,000 to 8,000 pounds per hour of raw lead to produce an essentially equivalent weight of PbO. The reactor is operated at a temperature in the range of about 425° to about 455° C. and the air flow through the reactor is maintained in the range of 4500 to 6500 cfm. To maintain a constant operating temperature, water is fed to the reactor at a rate of approximately 10 to 40 gallons per hour through the inlet 22 in the outlet end wall 6 only. The blade speed is maintained at a constant 250 rpm with the feed of molten lead varied as necessary to maintain the speed. The resultant product is a litharge having a free lead content well below 1% and as low as 0.05%. In excess of 99% of this litharge will pass a No. 325 screen by wet sieve analysis, qualifying it as a high quality litharge directly usable in glass manufacturing operations.

When utilizing the same reactor for the production of a leady litharge (18% to 32% Pb) used, for example, as the active material in a lead-acid battery, the molten lead feed rate is maintained at about 5,000 pounds per hour and results in an approximately equivalent output of leady litharge. The volume of air flow and the blade speed are maintained as in the previous example, the reactor is operated at a temperature in the range of 370° to 400° C., and water is added through both inlets 18 and 22 at a combined rate ranging from 15 to 40 gallons per hour. A typical leady litharge produced by this process, measured and evaluated by the use of standards and tests uniformly applied in the battery industry, contains 24% free Pb, has an apparent density of 23 grams per cubic inch (Scott number), an acid absorption of 190 ±20 micrograms per gram, and a wet sieve analysis of less than 5% retained on a 25 micron screen.

It is important to note that the two different oxide products described above are directly usable in their respective manufacturing applications without any further processing. Most importantly, the oxides produced by the method and apparatus of this invention require no subsequent milling to reduce the particle size. This obviates costly and time-consuming processing and drastically reduces the possibility of contamination, particularly iron contamination which is critical in oxides utilized in the manufacture of glass. The apparatus of the present invention is unique in its ability to utilize essentially the same process for the production of a broad range of high quality lead oxide products.

I claim:

1. In a reactor for the oxidation of lead particles to produce litharge with selectively varying free lead content includ.pa ing a horizontally disposed reactor chamber having a cylindrical interior surface and parallel opposite end walls, a shaft extending through the interior and supported for rotation on the longitudinal axis of the chamber, at least one pair of blades attached to the shaft, said at least one pair of blades being disposed generally parallel to the cylindrical surface and extending substantially the full axial length thereof, lead inlet means, water inlet means and air inlet means positioned with respect to one of said end walls for admitting supplies of lead, air and water to the interior of the chamber, an outlet in the other of said end walls for discharging the litharge therefrom, and means for producing a flow of air through the chamber to oxidize the lead particles and transport the litharge to the outlet; the improvement comprising:

the at least one pair of blades having radially outer edges which are disposed in closely spaced relation to the interior surface of the chamber to provide a uniform zone for oxidation, attrition and classification along substantially the entire blade edge-reactor interior surface interface; and, drive means for rotating the shaft and at least one pair of blades at a speed sufficient to maintain incompletely oxidized lead particles within the oxidation and attrition zone and to effect centrifugal classification of the litharge for transport to the outlet.

2. The reactor as defined in claim 1 including a preheater positioned and arranged with respect to the reactor chamber for bringing the reactor chamber to a selected operating temperature prior to commencing operation of the reactor.

3. The reactor as defined in claim 2 including a wiper blade attached to and rotatable with the shaft and having a free edge disposed closely spaced from the inlet end wall.

* * * * *